No. 648,983. Patented May 8, 1900.
H. W. NIEMEYER.
REMOVABLE HANDLE FOR COFFINS.
(Application filed Jan. 2, 1900.)

(No Model.)

Witnesses:

Inventor:
Henry W. Niemeyer
By Milo B. Stevens & Co.
Attorneys.

THE NORRIS PETERS CO., PHOTO-LITHO., WASHINGTON, D. C.

UNITED STATES PATENT OFFICE.

HENRY WM. NIEMEYER, OF CHICAGO, ILLINOIS.

REMOVABLE HANDLE FOR COFFINS.

SPECIFICATION forming part of Letters Patent No. 648,983, dated May 8, 1900.

Application filed January 2, 1900. Serial No. 146. (No model.)

*To all whom it may concern:*

Be it known that I, HENRY WM. NIEMEYER, a citizen of the United States, residing at Chicago, in the county of Cook and State of Illinois, have invented certain new and useful Improvements in Removable Handles for Coffins and the Like; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to removable handles for coffins and the like, and has for one object the provision of a handle which will be strong in construction, but at the same time light and capable of being folded into a convenient shape for carrying when not in use.

Another object of the invention is to so construct a handle of hinged members that when folded in closed position it will be effectively locked from accidental opening. Another object is to so construct the respective members in their relations to each other that when the device is applied to a coffin or the like the grip portion will be projected away from the sides of the coffin or receptacle to be carried, so that the hand of the user will not contact with the sides thereof and be injured.

The invention also contemplates the idea of providing a handle which may be primarily attached to and turned beneath the coffin until it is desired to carry the same, when the handle may be turned outward into operative position and be positively locked in such outward position as to practically form a single rigid member upon which the leverage is applied in carrying the coffin.

An embodiment of the invention is shown in the accompanying drawings, wherein like reference-letters refer to corresponding parts in the several views.

Figure 1:
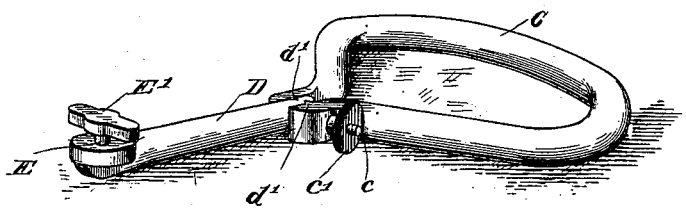
Figure 2:
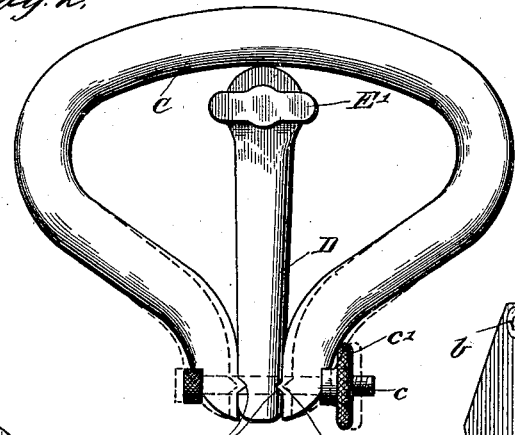
Figure 4:
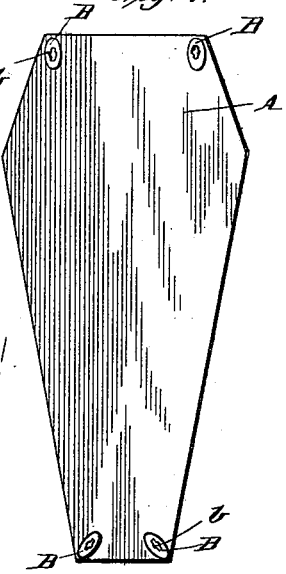
Figure 3:
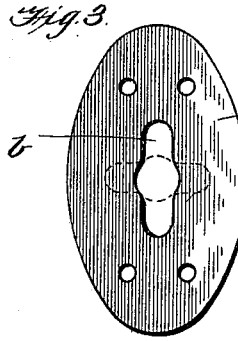

Figure 1 is a perspective view of the handle in open position. Fig. 2 is a plan view showing the shank closed within the loop or grip portion of the handle and the means for locking the same in such position, the springing tendency of the ends of the loop being indicated by dotted lines. Fig. 3 is a view of the metallic plate designed to cover the openings in the bottom of the coffin and provided with a suitable slot for the insertion of the head at the end of the shank for holding the same temporarily in position on the coffin. Fig. 4 is a bottom view of a coffin, showing the relative positions of the protector-plates and their slots when secured in position; and Fig. 5 is a detail view showing the handle in position to be grasped.

Referring to the figures of the drawings, A represents a coffin or other receptacle designed to be carried by means of the implement hereinafter described, and B represents metallic protector-plates designed to cover suitable openings (not shown) in the bottom of the coffin and having the elongated slots $b$ therein for the purpose hereinafter pointed out.

C designates the grip portion of my device, which is formed in the shape of a loop so constructed that its ends have a tendency to spring outwardly, as clearly illustrated in Fig. 2. These ends of the loop are connected by means of the bolts and thumb-nut $c'$. Pivoted within the ends of the loop C and upon the bolt $c$ is a shank portion D, having on its opposite sides, at points approximately in the plane of its pivot, notches $d$, adapted, when in closed position, Fig. 2, to receive the lugs or projections $d'$ on the inside of the ends of the loop C and be held in place thereby, the bolt and thumb-nut being capable of adjustment to overcome the springing tendency of the loop, so that its ends will be caused to bind upon the sides of the shank and project the lugs into the slots or notches in the shank when it is desired to lock the same either in closed or open position. At the extreme end of the shank and projecting at right angles thereto is a stub E, designed to carry at its end the elongated head E', which in turn is of such shape as to be readily inserted in the corresponding openings in the protector-plates B. The relative positions of the head E upon the shank and the slots in the protector-plates are such that when the handle is in operative position the head will occupy a position beneath the plates B at right angles to the slot therein, and thereby be held in place, as shown in dotted lines in Fig. 4. The length of the shank D is such that it will when in position on the bottom of the coffin be completely hidden thereby, and the grip portion may readily be turned under out of view until the coffin is to be transported, as shown in dotted lines, Fig. 5.

Figure 5:
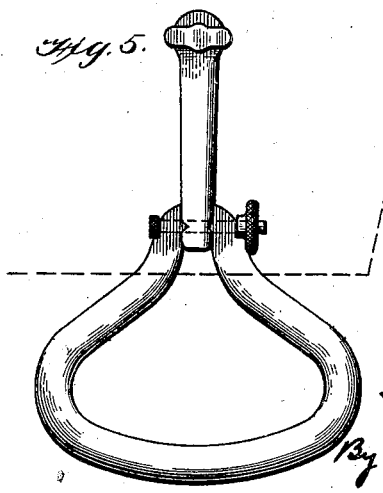

When in position for use, the handle will be turned outward, as shown by full lines, Fig. 5, and the thumb-nut screwed up tightly, when the lugs on the ends of the loop will engage the shank and lock the same so effectually that the whole will present one rigid lever member, as will be readily appreciated.

From this construction it will be seen that I have provided an efficient detachable handle which will in use be rigid and strong and which when not in use will be readily folded into small space and slipped into a pocket or other place for carrying; also, that when the handle is in use the relative positions of the slotted plates and the headed shank are such that there will be no danger or possibility of the handle becoming accidentally disengaged while the coffin is being carried.

Having thus described my invention, what I claim as new, and desire to secure by Letters Patent, is—

1. A coffin-handle comprising two members pivotally secured together, means for locking said members in adjusted positions, and means on one of the members adapted to be detachably secured to a coffin, substantially as described.

2. In combination with a coffin or like receptacle, having suitable engaging portions thereon, of a handle comprising two members pivotally secured together, one of said members being of a length to project from the engaging means on the coffin to a point slightly short of the sides thereof, and means at the end of such member adapted to engage with the engaging means on the coffin, substantially as described.

3. A coffin-handle comprising two members pivotally secured together, one of said members having a springing tendency relative to the other, and means on one of the members adapted to hold the same in position on a coffin substantially parallel with the bottom or side thereof, substantially as described.

4. A coffin-handle comprising two members movably connected together, means for locking the same in adjusted positions, and means on one of the members adapted to hold the same in position on a coffin substantially parallel with the bottom thereof, substantially as described.

In testimony whereof I affix my signature in presence of two witnesses.

HENRY WM. NIEMEYER.

Witnesses:
WM. J. ROBINSON,
E. M. STALEY.